Aug. 12, 1969  L. H. SEIFERT  3,460,690
QUICKLY DETACHABLE LOADER
Filed Aug. 18, 1967  3 Sheets-Sheet 2
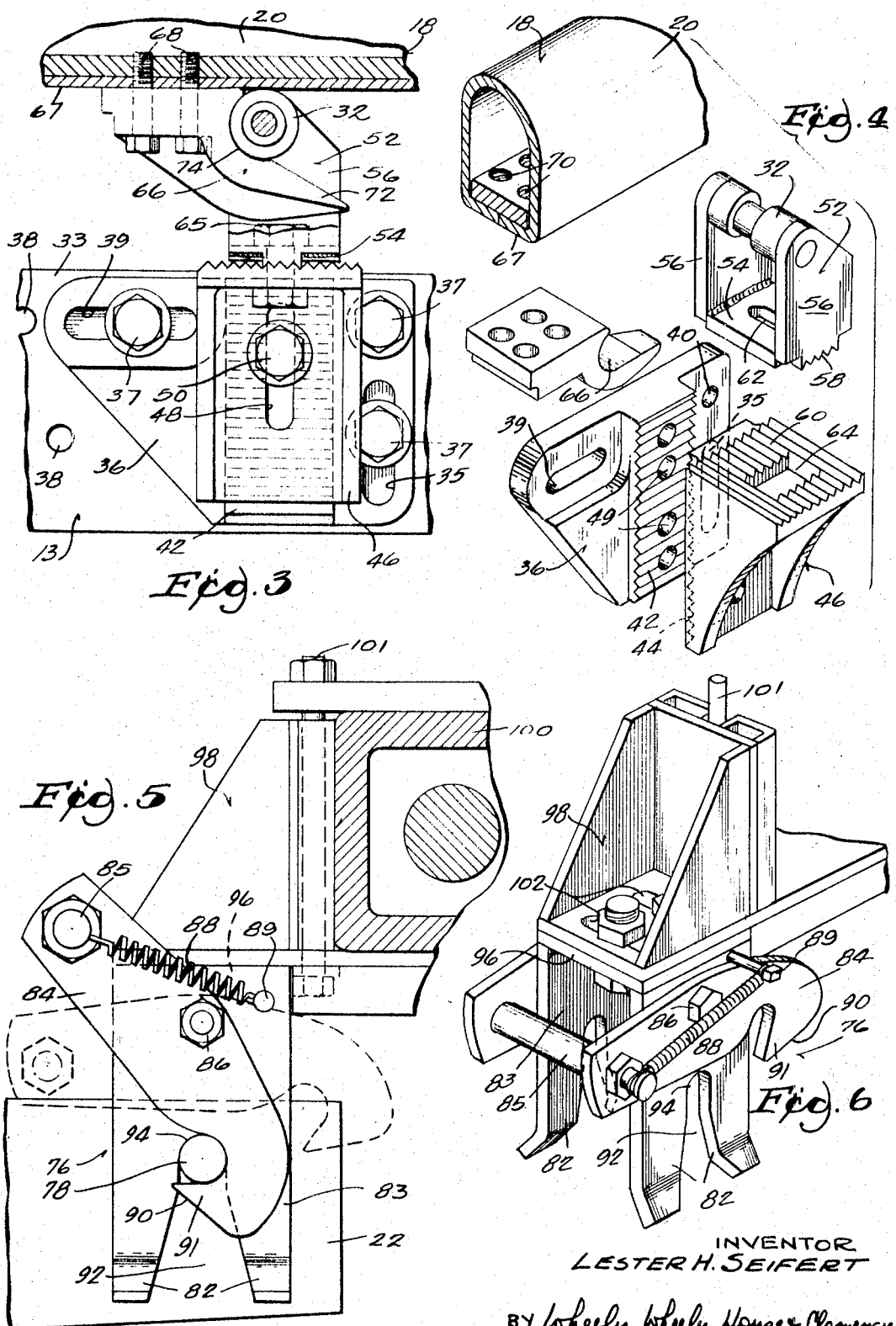
INVENTOR
LESTER H. SEIFERT
BY Wheely, Wheely, House & Clemency
ATTORNEYS

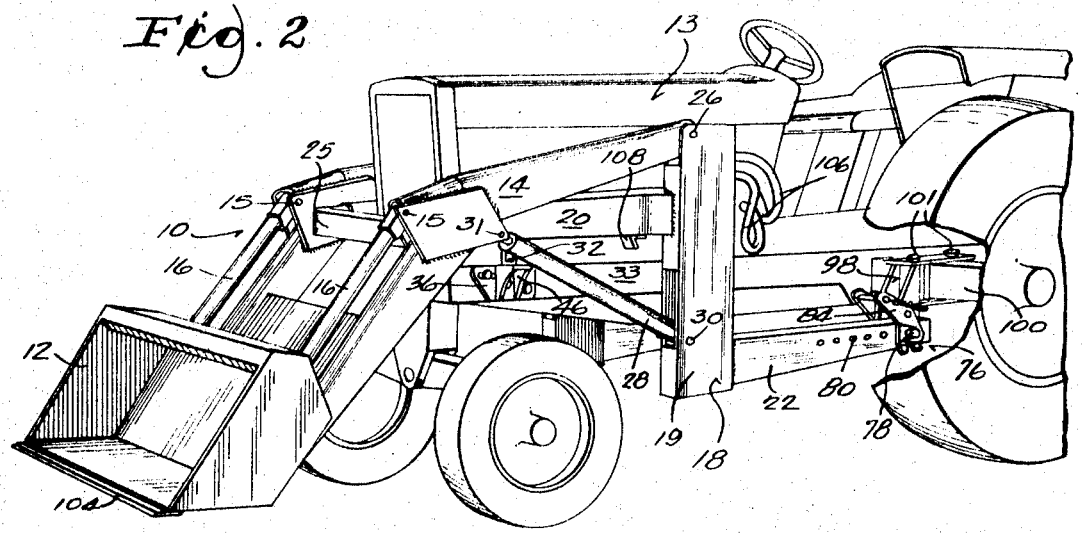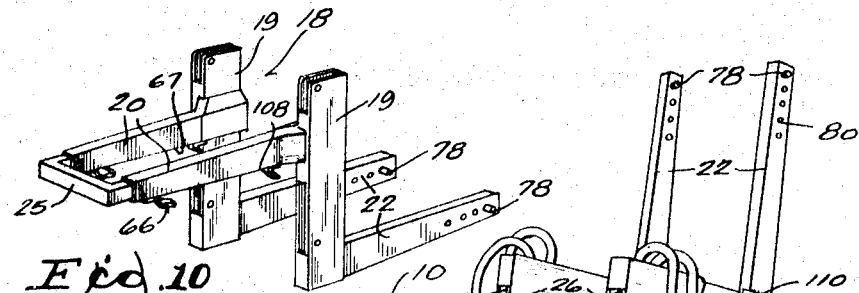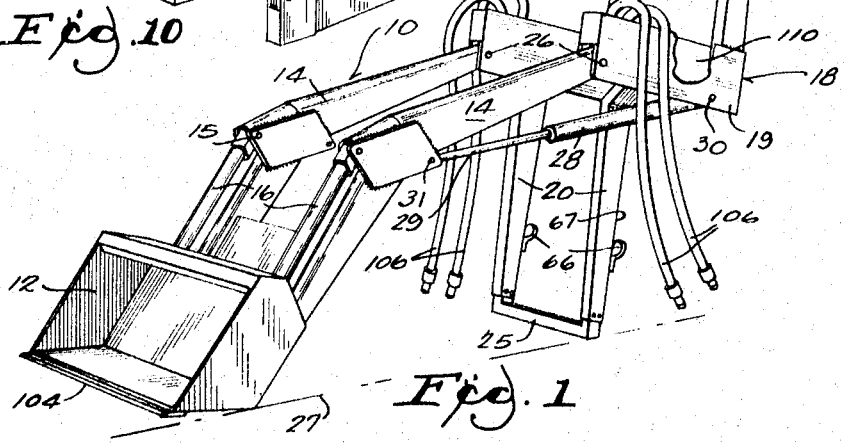

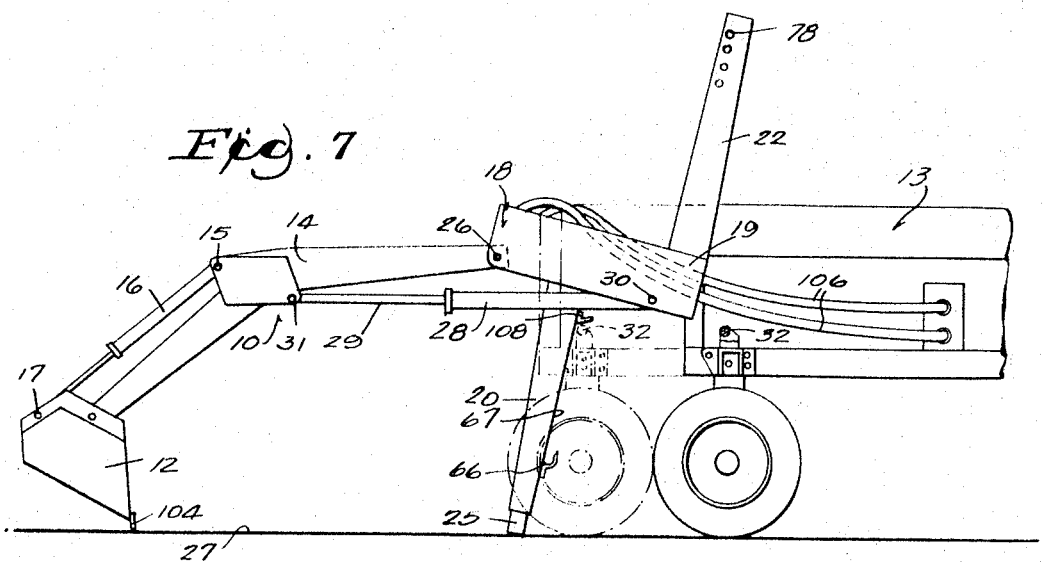

United States Patent Office 3,460,690
Patented Aug. 12, 1969

3,460,690
QUICKLY DETACHABLE LOADER
Lester H. Seifert, Box 95, St. Nazianz, Wis. 54232
Filed Aug. 18, 1967, Ser. No. 661,579
Int. Cl. E02f 3/62
U.S. Cl. 214—140        10 Claims

ABSTRACT OF THE DISCLOSURE

A front end loader attachment for a tractor is supported on the tractor by paired cross-connected Z-shaped side frames which are tilted forwardly with forward frame arms engaging the ground to support the loader in a parked dismounted position. Horizontally extending trunnions adjustably mounted on each side of the tractor at the forward end of the tractor provided pivot points about which the side frames are swung from their parked position to their tractor mounted position under retraction pressure of the loader boom lifting hydraulic cylinders. The trunnions also support the loader in the mounted position. In the mounted position, the rear arms of the side frames are secured in downwardly open hitches located on the rear axle housing.

BACKGROUND OF INVENTION

The invention relates to front end loader attachments for tractors. A problem in the art is to provide such an attachment which is easily mounted and demounted from a tractor in a minimum time and with a minimum of effort so that the tractor can be utilized for various other purposes. Prior art devices have utilized various arrangements including parking stands or parking legs, hydraulic jacks, etc., for support of the loader in a parked position. Such additional equipment increases the cost of manufacture of the loader and the complexity of attachment or detachment from the loader.

SUMMARY OF INVENTION

The invention provides a front end loader attachment for a tractor which is easily transferred between parked and tractor mounted positions while the tractor operator remains seated on the tractor. A unique loader frame is utilized to support the loader respectively on the tractor and in a parked position without the need for parking legs, stands, etc. Mounting and dismounting the loader attachment in less than a minute is possible by the cooperation of Z-shaped side frames with lateral or horizontally extending trunnions adjustably mounted on each side of the tractor adjacent the forward end of the tractor. The trunnions function as fulcrums for pivotal movement of the side frames from a parked position to the mounted position and as fixed supports for the side frames when the loader is in use. The boom lifting cylinders are used to perform the work involved in pivoting the side frames for attachment of the loader to the tractor.

Each side frame has a central mast and forward and rear mounting arms. A bumper connects the ends of the forward arms and rests on the ground in the parked position of the loader. In the parked position the loader bucket also rests on the ground. When the loader is in a mounted position, the forward arms rest on the trunnions and the rear arms are secured in axle hitches mounted on the rear axle housing.

To pick up the loader from its parked position and transfer it to its mounted position on the tractor, the tractor is driven between the spaced apart side frames of the parked loader and the hoses of the hydraulic lift cylinders of the loader are connected to the conventional tractor hydraulic system. The loader side frames are then pivoted about the trunnions using the lift cylinders to swing the forward arms from the ground to a horizontal position. The tractor is then driven forward against the reaction of the bucket which remains in a fixed position because of the contact of its bucket with the ground. The trunnions roll along the underside of the forward arms until rearwardly open hooks on the undersurface of the forward side arms seat about the trunnions in the mounted position of the frame. The rear hitch is then connected to the rear ends of the arms. The loader is easily detached from the mounted position to the parked position following the converse of the foregoing procedure.

The laterally extending trunnions are vertically and horizontally adjustable to adapt various tractors for connection to the front end loader.

Further objects and advantages of the invention will become apparent from the following disclosure.

DRAWINGS

FIGURE 1 is a perspective view of my front end loader attachment shown in a parked position.

FIGURE 2 is a perspective view of the front end loader of FIGURE 1 mounted on a tractor.

FIGURE 3 is an enlarged view of a trunnion and a partially broken away side elevational view of the trunnion mounting bracket.

FIGURE 4 is an exploded view of the trunnion and trunnion mounting bracket.

FIGURE 5 is a fragmentary cross section through the rear axle showing the rear axle hitch in elevation.

FIGURE 6 is a perspective view of the rear axle hitch shown in FIGURE 5.

FIGURE 7 is a side view showing in full lines the front end loader in a parked position and the tractor separated from the loader and prior to driving it within the side frames in the mounting sequence. This view also shows in broken lines the tractor after it has been driven forward between the side frames.

FIGURE 8 is a side view of the loader and tractor with a side frame shown in full lines in a partially pivoted position removed from engagement with the ground, and in broken lines in a further pivoted position with the frame arms almost horizontal prior to driving the tractor forwardly again to finally seat the frame on the tractor.

FIGURE 9 shows the side frame in full lines after the tractor has been driven forward to seat the frame on the trunnions. This view also shows the frame in broken lines with its rear arms finally attached to the rear axle hitch.

FIGURE 10 is a perspective view of the Z-shaped frame.

DETAILED DESCRIPTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The front end loader 10 includes conventional parts such as a bucket or scoop 12, a pair of lift boom arms 14 pivotally connected to the bucket 12 and two hydraulic tilting cylinders 16 pivotally connected to the lift boom arms 14 by pins 15 and pivotally connected to the bucket 12 by pins 17.

In accordance with the invention, I provide a mounting frame 18 for the loader. Frame 18 comprises two spaced apart Z-shaped side frames for supporting and mounting the loader 10 on the tractor 13. The frames 18 also support the loader in a parked position. Each side frame 18 has an upright mast or post 19 and a forwardly extending upper arm 20 and a rearwardly projecting lower arm 22. The forward arms 20 are offset inwardly toward each other to extend within the boom arms 14 and have their front ends cross-connected by a bumper 25. The rear arms have a length sufficient to permit connection with hitches on the rear axle housing. Although the drawings show side frames having rearwardly projecting lower arms 22, the use of side frames without the rear arms 22 is within the purview of the invention.

In FIGURE 1 the front end loader is shown in a parked position demounted from a tractor with the forward arms tilted toward the ground and the bumper 25 and bucket 12 resting on the ground 27 to support the loader 10. Thus, a parking stand or parking legs are not required.

The loader booms 14 are pivotally connected to the upper end of the masts 19 by pins 26. The booms 14 are also connected to the masts 19 by a pair of hydraulic lift cylinders 28 which are pivotally connected to the masts 19 by pins 30. The piston rods 29 are connected to the booms 14 by the pins 31.

The front end loader 10 and frames 18 are mounted and supported in part on the tractor as hereinafter described in detail, by a pair of laterally horizontally extending fulcrum means which in the disclosed construction are in the form of trunnions 32 projecting from each side of the tractor 13. The trunnions 32 co-operate with the side frames 18 during the course of manipulating the side frames for mounting or demounting the loader to facilitate shifting the point at which the side frames 18 are supported during the mounting sequence and to afford pivotal movement of the side frames from a tilted parked position to a horizontal mounted position.

Bracket means are provided for rotatably supporting and adjustably mounting the trunnions 32 on the tractor frame 33 to adapt the front end loader to fit any tractor. In the disclosed construction the bracket means includes on each side of the tractor, a mounting plate 36 which is secured by bolts 37 to apertures 38 on the tractor frame 33. Each mounting plate 36 is provided with a vertically aligned slot 35 on the side edge of the bracket and a horizontally aligned slot 39 along the upper edge and an aperture 40 located at the intersection of the center lines of slots 35 and 39. Such arrangement adapts the mounting plate 36 to be secured to any tractor. The apertures 38 are conventionally provided in tractors for attachment of various implements. Mounting plate 36 has a serrated face 42 (FIG. 4) which interfits with complementary serrations 44 on a vertically adjustable shalf 46. A bolt 50 (FIG. 3) extends through slot 48 and into any of the apertures 49 in plate 36, thus permitting vertical adjustment of the shelf 46. The trunnions 32 are rotatably supported in U-shaped cradles 52 which have a bottom cross web 54 connecting opposed parallel cradle legs 56. Web 54 has undersurface serrations 58 which interfit with a serrated upper face 60 of shelf 46, thus to lock the cradle 52 in various adjusted positions, on the shelf 46. Horizontal fore and aft and lateral adjustment of the cradle 52 is afforded by slots 62 and 64 respectively in the cradle and shelf and a bolt 65 which extends through the slots. Accordingly, the trunnions can be adjusted in all directions in a limited range and are locked securely in adjusted position by the serrations.

To assist in mounting the front end loader on the tractor as herein described, the forward frame arms 20 are provided near their front ends with rearwardly open hooks 66 (FIGS. 3, 4, 7). These are bolted to the undersurface 67 of arms 20 by bolts 68 which are threaded into tapped apertures 70 in the arms 20. Each hook has a tongue portion 72 and an arcuate surface 74 which provides a seat for the trunnion 32 and a bearing surface for pivotal movement of the side frames.

When the front end loader 10 is mounted on the tractor, as shown in FIGURE 2, the rearwardly projecting arms 22 of Z-frame 18 are secured by two rear axle hitches 76 (FIGS. 2, 5, 6) located on opposite sides of the tractor body. The rearwardly extending legs 22 of Z-shaped frame 18 are respectively provided with cross pins 78 selectively located in one of a series of apertures 80. These pins 78 are adapted to be received in the froked fingers 82 of the side legs 83 of the hitch 76. Latch arms 84 releaseably lock the pins. Arms 84 swing on bolt pintle 86. The latch arms 84 are biased by a spring 88 into a closed position as shown in full lines in FIGURE 5. The spring 88 has one end secured to bolt 85 which cross connects the ends of latch arms 84. The other end is secured to a side leg 83 by a bolt 89. When the latch arms 84 are closed with the hook portions 91 of the latch arms located in the gaps 92 between the fingers 82, as shown in full lines in FIGURE 5, movement of the pin 78 into gap 92 during mounting of the front end loader to the tractor will cause engagement of the pin 78 with a cam surface 90 on the hook portions 91 and cam the latch arms 84 outwardly from gap 92 to permit the pin 78 to seat in the crotch 94 between the fingers 82. The latch 84 then returns to the closed position under the bias of spring 88, thus locking the pin 78 in place. When the latch 84 is pivoted about bolt 86 overcenter, as shown in broken lines in FIGURE 5 and in full lines in FIGURE 6, the spring 88 will hold the lock arms in open position to permit withdrawal of pins 78.

The side legs 83 of the hitch 82 are connected by a web 96 (FIG. 6) which is secured to a bracket 98 which is mounted on the box section rear axle 100 by bolts 101. Thus, the loading forces on the front end loader, as for instance whne pushing forwardly into a mound of dirt, are carried by the rear axle 100 which is typically the most rigid portion of the tractor frame. Slots 102 in the bracket afford horizontal lateral adjustment of the bracket 98.

The method by which the Z-frame is utilized to transfer the loader between parked and tractor mounted positions is illustrated by the sequence of steps shown in FIGURES 7, 8 and 9. In FIGURE 7 the front end loader 10 and frame 18 are shown in full lines in a parked, demounted or idle storage position with the bucket scraper blade 104 engaging the ground 27. Frame arms 20 are tilted downwardly to ground engaging position. The tractor is shown in full lines spaced a short distance from the Z-shaped side frames 18. The hydraulic fluid supply lines 106 for cylinders 28 are connected to the tractor when in the position. Once the hydraulic supply lines are connected to the tractor, the tractor operator can remain seated on the tractor during the remaining steps in the mounting sequence. The tractor is then driven forwardly between the side frames 18 to the position shown in broken lines (FIG. 7) with the trunnions 32 engaging the undersurface 67 of the forward or upper frame arms 20 below the stop lugs 108.

Transfer of the loader from its parked position onto the tractor is then accomplished by utilizing the hydraulic cylinders 28. If the loader frame is in a parked position with the rear frame arms 22 resting on the ground, the loader frame can be pivoted to the position shown in FIGURE 1 by expanding the cylinders 28. The tractor operator actuates cylinders 28 to retract the piston rods 29. This causes the sides frames 18 to rotate or pivot about trunnions 32 which function as fulcrums as the forward arms 20 are pulled toward the booms 14 by the cylinders 28. Each side arm 20 is provided with a stop lug 108 projecting from its undersurface near its rear end. Lug 108 defines the point on the arm 20 which remains in contact with the trunnions 32 during pivotal movement of the side frames 18.

As shown in FIGURE 8, continued actuation of the cylinders 28 will cause pivotal movement of the Z-shaped side frames 18 through the position shown in full lines in which the bumper 25 has been raised from the ground and the weight of the frame 18 is now sustained on the trunnions 32 and thence to the position shown in broken lines which is not quite horizontal. It is important that the ends 109 of the rear arms be lower than the axle hitches 76 at this stage in the sequence.

Next, the tractor is driven forwardly to slide or roll the trunnions 32 along the undersurface 67 of the forward arms 20 until the trunnions 32 engage or are received in stop lugs or hooks 66 at the forward end of the arms, as shown in FIGURE 9 in full lines. In the event that the ends 109 of the arms 22 are in engagement with the ground and supporting the frame 18 when the frame is pivoted to the position shown in FIGURE 9, the forward arms 20 will not be in engagement with the trunnions 32. Accordingly, the trunnions do not support the frame 18 or roll along the forward arms 20 as the tractor is driven forwardly between the side frames 18. Continued ground engagement of bucket 12 during movement of the tractor holds the frame 18 against movement during this procedure. Pins 78 at the rear ends of arms 22 are thus located beneath the rear axle hitches 76. The cylinders 28 are now expanded to raise arms and engage pins 78 with the hitches 76. As the pin 78 enters the gap 92 the latch 84 is cammed out of the gap 92, thus permitting the pin 78 to seat in the crotch 94. The latch 84 then closes under bias of spring 88 to lock the pin and retain the side frames 18 from angular displacement about trunnions 32. The loader 10 and frame 18 are now fully mounted.

To detach or demount the front end loader from the tractor the converse sequence of steps or order of procedure is followed. The latch 84 is flipped to its overcenter, open position and the side frames 18 are pivoted to their full line positions shown in FIGURE 9. The bucket 12 is placed in ground engagement to anchor the Z-frame 18 against movement. The tractor is then backed rearwardly to withdraw the trunnions 32 out of engagement with hooks 66 and slide them along the undersurface of the upper arms 20 until the trunnions 32 engage the stop lugs 108, as shown in broken lines in FIGURE 8. The cylinders 28 are then expanded to pivot the side frames about trunnions 32 through the full line positions in FIGURE 8 and until the bumper engages the ground to lift lug 108 above trunnions 32 as shown in full lines in FIGURE 7. The hydraulic hoses 106 can then be disconnected and the tractor withdrawn from the side frames 18. The hydraulic hoses 106 can then be stowed into pockets 110 in the masts 19 when the loader is not in use.

From the foregoing it is clear that the loader can be quickly mounted and demounted in a brief period with no manual exertion by the tractor operator. The tractor can be used for other purposes while the loader sits idle in a parked position. The use of the side frames for support in the parked position eliminates the need for the parking stand required by prior art loaders.

The adjustable mountings for the trunnions and the rear axle hitches simplifies attachment to any tractor on the farm without substantial modifications to the tractor frame. The trunnions and rear axle hitch may be permanently installed on the tractor and do not interfere with the use of other accessories on the tractor.

I claim:
1. In the combination of a tractor, a front end loader, a frame by which the loader is mounted on the tractor, and a hydraulic cylinder between the loader and frame and by which the loader is swung with respect to the frame, the improvement for transferring the loader and frame between a self supporting parked position and a tractor mounted position comprising:
   said tractor having laterally projecting trunnions,
   said frame having a mast to which the loader is pivotally connected and arms which project forwardly from the mast when the loader is in tractor mounted position,
   said arms having front and rear stops,
   said hydraulic cylinder being extendible to swing the frame arms to a downwardly projecting position in which the frame and loader is supported from the ground in self supported position by the loader and the frame,
   said rear stops being engageable with said trunnions when the tractor is driven into engagement with the frame and defining a pivot point on said arms about which said frame swings when the cylinder is contracted to transfer the load of the frame from the ground to the tractor and swing the arms into forwardly projecting positions,
   said tractor having a rear axle with a downwardly open rear hitch,
   said frame having rearwardly projecting arms with hitch coupling pins,
   said front stops defining pivots about which the frame swings to move said pins upwardly into engagement with said hitch.

2. The improvement of claim 1 in combination with bracket means on which said trunnions are mounted to the tractor for adjustment both horizontally and vertically.

3. In the combination of a tractor, a front end loader, a frame by which the loader is mounted on the tractor, and a hydraulic cylinder between the loader and frame and by which the loader is swung with respect to the frame, the improvement for transferring the loader and frame between a self supporting parked position and a tractor mounted position comprising:
   said tractor having laterally projecting trunnions,
   bracket means supporting said trunnions, said bracket means comprising a mounting plate, said mounting plate having vertical and horizontal slots, bolts extending through said slots and into said tractor frame, a U-shaped cradle having parallel spaced apart side legs connected by a web, said side legs having apertures for rotatably supporting the trunnion, a shelf vertically adjustably connected to said mounting plate, said shelf supporting said cradle, and slots in said web of said cradle and said upper face of said shelf, and a bolt extending through said slots,
   said frame having a mast to which the loader is pivotally connected and arms which project forwardly from the mast when the loader is in tractor mounted position,
   said arms having rear stops,
   said hydraulic cylinder being extendible to swing the frame arms to a downwardly projecting position in which the frame and loader is supported from the ground in self supported position by the loader and the frame,
   said rear stops being engageable with said trunnions when the tractor is driven into engagement with the frame and defining a pivot point on said arms about which said frame swings when the cylinder is contracted to transfer the load of the frame from the ground to the tractor and swing the arms into forwardly projecting positions.

4. The improvement of claim 1 wherein said rear hitch comprises spaced apart side legs, said side legs having forked fingers, latch arms pivotally connected to said legs, and means biasing said latch arms to an open overcenter position and a closed position in engagement with said cross pin in each of said rear arms.

5. A front end loader attachment for a tractor having trunnions, said attachment comprising a pair of spaced apart side frames adapted to extend longitudinally of the tractor, said side frames each having a mast, and each mast having a forward and rear arm, a loader boom pivotally connected to said mast, a hydraulic cylinder pivotally interconnecting the frame and boom, a stop lug on each of said forward side arms, said lugs being located adjacent said mast, said stop lugs being adapted to engage the tractor trunnions to afford pivotal movement of said side frames upon actuation of said hydraulic cylinders connected to said mast to position said arms in a mounted position, each of said forward arms having a stop spaced remotely from said mast, said stop being adapted to engage said trunnion upon forward movement of the tractor within the side frames and to afford further pivotal movement of said side frames upon further actuation of said cylinders to position the rear ends of said rear arms for connection to the hitches on the tractor axle housing.

6. A bracket for supporting a trunnion on a tractor comprising a mounting plate, a shelf vertically adjustably connected to said mounting plate and a cradle horizontally adjustably connected to said shelf, and said cradle being adjustable laterally and fore and aft of said tractor.

7. A bracket in accordance with claim 6 wherein said mounting plate has a horizontally aligned slot along the upper edge of said bracket and a vertically aligned slot along a side edge of said bracket and an aperture located at the intersection of the center lines of said vertically aligned and horizontally aligned slots.

8. The bracket of claim 6 wherein said mounting plate has a serrated surface and said shelf has a serrated surface adjacent said mounting plate which interfits with said serrations on said mounting plate to secure said shelf against vertical displacement and wherein said cradle has serrated lower edges which interfit with complementary serrations on the upper surface of said shelf to secure said cradle against horizontal displacement.

9. The combination of a tractor having a rear axle and a front end loader, said front end loader comprising a pair of spaced side frames, each side frame having a mast with forwardly and rearwardly extending arms, a loader pivotally connected to said mast, said forward arms having front and rear stops, laterally projecting trunnions on said tractor engageable with said stops, said rearwardly projecting arms projecting beneath said rear axle when said front end loader and frame are mounted on said tractor and downwardly open hitches on said rear axle which receive said rearwardly extending arms.

10. A method of mounting of loader on a tractor which has laterally extending trunnions adjacent its forward end and wherein the loader has spaced side frames with forwardly and rearwardly projecting arms with hydraulic lift cylinders connected between the loader and side frames, comprising the steps of positioning the loader frame with its forwardly projecting arms tilted down to ground engagement and with its hydraulic lift cylinders expanded, driving the tractor between the side frames to engage the trunnions with the forwardly projecting arms of the frame, retracting the cylinders to pivot the side frames about the trunnions until the ends of the rearwardly extending arms of the side frames are pointing toward the ground, driving the tractor forwardly until the ends of the rear arms are beneath the rear axle and pivoting the side frames to move the ends of the rearwardly projecting arms upwardly into engagement with hitches on the rear axle.

References Cited

UNITED STATES PATENTS

| | | | |
|---|---|---|---|
| 2,972,424 | 2/1961 | Cadwell | 214—131 X |
| 3,324,954 | 6/1967 | Westendorf | 214—140 X |

HUGO O. SCHULZ, Primary Examiner

U.S. Cl. X.R.
214—152